United States Patent
Dion (10) Patent No.: US 7,040,470 B2
(45) Date of Patent: May 9, 2006

(54) OVERLOAD CLUTCH FOR PROTECTING A DRIVE TRAIN

(75) Inventor: Gérald Dion, Mashteuiatsh (CA)

(73) Assignee: Gemofor Inc., Normandin (CA)

( * ) Notice: Subject to any disclaimer, the term of this patent is extended or adjusted under 35 U.S.C. 154(b) by 0 days.

(21) Appl. No.: 10/831,028

(22) Filed: Apr. 23, 2004

(65) Prior Publication Data
US 2004/0211639 A1    Oct. 28, 2004

(30) Foreign Application Priority Data
Apr. 25, 2003    (CA) .................................... 2426354

(51) Int. Cl.
*F16D 7/10*    (2006.01)
(52) U.S. Cl. ................. 192/56.3; 192/76; 464/37
(58) Field of Classification Search ............... 192/55.1, 192/56.1, 71, 76, 78, 55.3, 56.3, 54.3, 57, 192/85 AT; 464/37
See application file for complete search history.

(56) References Cited

U.S. PATENT DOCUMENTS

| | | | | |
|---|---|---|---|---|
| 1,562,442 A | * | 11/1925 | Evans ........................ | 464/37 |
| 1,703,061 A | * | 2/1929 | Coleman .................... | 74/64 |
| 2,115,958 A | | 5/1938 | Lee | |
| 4,081,063 A | | 3/1978 | Malmros et al. ........... | 192/56 |
| 4,220,230 A | | 9/1980 | Hansen ....................... | 192/56 |

(Continued)

FOREIGN PATENT DOCUMENTS

DE    833576 C    3/1952

(Continued)

*Primary Examiner*—Saul Rodriguez (57) ABSTRACT

An overload clutch for a torque transmission is disclosed which comprises a rotatable drive member coaxially coupled to a rotating driven member. One of the drive member and driven member, hereinafter referred to as the first member, comprises an annular band delimiting a central space, the annular band having a cylindrical inner face provided with at least one engaging element. The other one of the drive member and driven member, hereinafter referred to as the second member, is mounted within the central space and comprises a radially expandable mechanism provided with at least one coupling element. The radially expandable mechanism is movable between an expanded position, where the at least one coupling element is positively engaging the at least one engaging element to couple the first member to the second member for rotation together, and a retracted position, where the at least one coupling element is disengaged from the at least one engaging element, thereby releasing the first member from the second. A biasing means, preferably a pneumatic actuator, is provided for normally resiliently urging the expandable mechanism in the expanded position, and for allowing the same to move to the retracted position when a predetermined torque overload is applied to the torque transmission.

11 Claims, 8 Drawing Sheets

U.S. PATENT DOCUMENTS

| | | | |
|---|---|---|---|
| 4,344,306 A | 8/1982 | Citron | 464/34 |
| 4,467,902 A | 8/1984 | Girguis | 192/56 |
| 4,548,305 A | 10/1985 | Anderson | 192/56 |
| 4,646,894 A | 3/1987 | Kamio | 192/85 |
| 4,746,320 A | 5/1988 | Kilwin | 464/36 |
| 4,770,281 A | 9/1988 | Hanks | 192/56 |
| 4,798,559 A | 1/1989 | Maurer et al. | 464/38 |
| 4,875,528 A | 10/1989 | Thackston | 173/12 |
| 4,901,610 A | 2/1990 | Larson et al. | 81/473 |
| 5,035,311 A | 7/1991 | Girguis | 192/56 |
| 5,415,575 A | 5/1995 | Karls | 440/75 |
| 5,531,307 A | 7/1996 | Fechter et al. | 192/56.4 |
| 5,672,110 A | 9/1997 | Kurita et al. | 464/37 |
| 5,807,179 A | 9/1998 | Hansen et al. | 464/33 |
| 6,059,085 A | 5/2000 | Farnsworth | 192/55.1 |
| 6,244,961 B1 * | 6/2001 | Kleiner | 464/37 |
| 6,398,654 B1 | 6/2002 | Viaud | 464/33 |
| 6,471,024 B1 | 10/2002 | Ota et al. | 192/56.5 |

FOREIGN PATENT DOCUMENTS

| | | |
|---|---|---|
| FR | 1506601 A | 12/1967 |
| GB | 2071236 | 9/1981 |

* cited by examiner

OVERLOAD CLUTCH FOR PROTECTING A DRIVE TRAIN

FIELD OF THE INVENTION

The present invention relates generally to clutches, and more particularly to an overload clutch for protecting a torque transmission (also referred to as a drive train) against overload charges and/or shocks.

BACKGROUND OF THE INVENTION

Known in the art are different clutch types that are aimed at protecting a torque transmission against a sudden overload occurring between a driven member and a drive member. When such an overload occurs, there is a need to disengage the drive member in order to avoid any permanent damage to the drive mechanism. The overload clutches known from prior art have low or medium torque capacities. One will find three main basic principles behind the design of the clutches from prior art.

The principle behind the first type of overload clutches is the use of a shear pin that allows a drive line subjected to an overload to disengage. An example of such an overload clutch is given in U.S. Pat. No. 6,398,654. This patent discloses an overload clutch with a shear pin element, interconnecting a drive shaft and a driven chain sprocket. The overload clutch includes a first clutch element fixed for rotation with the shaft, a second clutch element mounted on the shaft next to the first clutch element, for axial and rotation of movement relative to the first clutch element. The second clutch includes a circular flange disposed against a flat circular surface of the sprocket and coupled for rotation therewith by a shear pin extending through aligned holes in the flange and sprocket. The first and second clutch elements respectively have positive engaging surface elements that are normally held in locking engagement which each other by a coil compression spring acting between the shaft and this sprocket. When the clutch is subjected to an overload, the shear pin shears.

The principle behind the second type of overload clutches resides in the use of slippage between friction discs that cooperate with each other to engage and disengage the clutch. When a drive train is subjected to a torque overload, the discs are caused to slip one with respect to each other, thereby causing the clutch to disengage. An example of a slip clutch is given in U.S. Pat. No. 5,807,179 which discloses a torque overload coupler for a driveline that allows limited free motion. In one embodiment, the torque overload protection is provided by a friction slip clutch and tangs form at the inner parameter of a clutch plate fit into spaces between logs defined on a hub to provide a limited range of free motion. In one aspect of the disclosed invention, a first means for connecting the copier to a torque input shaft and a second means for connecting the coupler to a torque output shaft have a bearing between them for allowing relative rotation and fixing them axially. A clutch housing is fixed to the first connecting means and a clutch plate in the clutch housing which engages the housing as tangs defined at an inner parameter with interstitial angular spaces between the tangs. A pressure plate is provided in the clutch housing which is biased against the clutch plate so that the clutch is normally engaged. Under operation, when the device is being used to transmit torque in the operation of the driveline, the torque is transmitted by the logs abutting the tangs and is transmitted up to the torque value at which slippage occurs between the clutch plate and the housing and pressure plate. One drawback with slip clutches is that, as time goes by, they wear out and they either have to be replaced or remachined.

The third type of clutches known in prior art, which makes use of spherical couplings housed between two circular coaxial clutch elements, has a very low capacity. An example of such a clutch is givent in U.S. Pat. No. 4,467,902. This patent discloses an overload clutch where two co-axial clutch members, one driving and one driven, are normally coupled for joint rotation by several peripherally spaced rotary coupling elements projecting under a resilient biasing force into aligned sets of recesses thereof, at least one of these sets having camming edges by which the coupling elements are dislodged against their biasing force when the driven clutch members tend to lag behind the driving clutch member in the event of an overload. U.S. Pat. No. 5,672,110 gives another example of an overload clutch of that type.

Also known in the prior art, there is U.S. Pat. No. 6,471,024 B2 which discloses a torque limiting mechanism for transmitting power from an external drive source to the drive shaft of a compressor. A pulley which is coupled to the external drive source, has elastic members. A hub, which is attached to the drive shaft, has engaging portions. A coupler member is located between the pulley and the hub. The coupler member is engaged with the elastic members and with the engaging portion such that power is transmitted from the pulley to the hub. The urging members urge the coupler member such that the coupled member is disengaged from the engaging portion. Once power is transmitted from the pulley to the hub, the elastic members maintain the coupler engaged with the elastic members and the engaging portion. When load generated due to power transmission exceeds a predetermined level, the elastic members are deformed such that the coupler member is disengaged from the elastic members. When disengaged from the elastic members, the coupler member is disengaged from the engaging portions.

A further type of overload clutches is disclosed in U.S. Pat. No. 4,846,894 which describes a pneumatic clutch apparatus. The disclosed apparatus is aimed to be disposed at the rear of a transmission and has a pneumatic actuator for engaging and disengaging the clutch. The clutch comprises a flywheel connected to an output shaft of the engine, a clutch disk connected to an output shaft of the clutch, a pressure plate and a clutch cover. The clutch cover is fixed at the outer periphery of the outer peripheral portion of the flywheel. A pneumatic actuator is fixed to the clutch cover. The actuator is designed to force the pressure plate, so that the plate may press a friction facing at the radially outer portion of the disk against the flywheel to engage the clutch. The actuator is located between the pressure plate and the clutch cover. The actuator is provided with a cylinder fixed to the cover, at this end fitted into the cylinder and a case surrounding the cylinder. The piston is fixed to bosses of the plate with a heat insulator and the case in between. A pressure chamber is formed between the piston and the cylinder. When a pneumatic high pressure is supplied into the chamber, the piston forces the plate toward the flywheel. The pressure chamber is connected through an air passage mechanism to a pneumatic pressure control mechanism disposed at the outside of the housing. The pneumatic pressure control mechanism is so constructed that the compressor is connected through an air tank and a pressure regulator valve to a pressure control valve. The compressor is adapted to be driven by the engine. The regulator valve regulates the pneumatic pressure to be supplied to the control valve to a constant value. When the full pressure is introduced into the chamber, the clutch is engaged.

When the pressure in the chamber is released, the clutch is disengaged. When a low pressure is introduced into the chamber, the clutch takes a half-engaged condition in which the facing is pressed against the flywheel with slipping thereon.

The following documents also disclose different overload clutches: U.S. Pat. Nos. 4,081,063; 4,344,306; 4,004,667; 4,220,230; 4,548,305; 4,746,320; 4,770,281; 4,798,559; 4,875,528; 4,901,610; 5,531,307; 6,059,085; 6,447,397B1; 5,415,575 and 5,030,311.

One drawback with the above-mentioned prior art clutches is that reengagement of the decoupled drive and driven members of most of these clutches requires a deactivation of the driving member and a realignment of their parts. For those where a reengagement can be carried out automatically, they are rather noisy decoupled, owing to a ratchet effect when the spherical coupling bodies pass by their respective recesses as an example. Furthermore, most of the clutches from prior art have a predetermined capacity which can be changed only by dismantling the mechanism and stopping the machinery.

There is therefore still a need for an improved overload clutch which is simple to use for an operator and which also allows an automatic reengagement of the decoupled members after the occurrence of an overload.

SUMMARY OF THE INVENTION

An object of the present invention is to provide an overload clutch that satisfies the above-mentioned need.

According to the present invention, that object is achieved with an overload clutch for a torque transmission, comprising a rotatable drive member coaxially coupled to a rotating driven member. One of the drive member and driven member, hereinafter referred to as the first member, comprises an annular band delimiting a central space, the annular band having a cylindrical inner face provided with at least one engaging element. The other one of said drive member and driven member, hereinafter referred to as the second member, is mounted within the central space. The second member comprises a radially expandable mechanism provided with at least one coupling element. The radially expandable mechanism is movable between an expanded position where the at least one coupling element is positively engaging the at least one engaging element to couple the first member to the second member for rotation together, and a retracted position where the at least one coupling element is disengaged from the at least one engaging element, thereby releasing the first member from the second. The second member also comprises a biasing means for normally resiliently urging the expandable mechanism in the expanded position and for allowing the same to move to the retracted position when a predetermined torque overload is applied to the torque transmission.

Preferably, the second member comprises a support with a hub and two opposite radial extensions; and the expandable mechanism comprises a lever with a first end portion pivotally attached to a first one of the extensions and a second end portion attached to a second one of the extensions by means of the biasing means. In that embodiment, the coupling element is located along the lever between the first and second end portions.

Also preferably, the coupling element of the second member is a roller and the engaging element of the first member is a recess dimensioned to fit the roller, the roller being allowed to roll on the cylindrical inner face of the annular band when the first member is released from the second member.

The biasing means may consist of a spring such as an helicoidal spring or a rubber element. However, in accordance with a further preferred object of the invention aimed at providing an overload clutch with a high adjustable capacity, the biasing means comprises a remotely controllable actuator, preferably a pneumatic actuator, generating a force for urging the expandable mechanis in the expanded position.

BRIEF DESCRIPTION OF THE DRAWINGS

These and other objects and advantages of the invention will become apparent upon reading the detailed description and upon referring to the drawings in which.

While the invention will be described in conjunction with example embodiments, it will be understood that it is not intended to limit the scope of the invention to such embodiments. On the contrary, it is intended to cover all alternatives, modifications and equivalents as may be included as defined by the appended claims.

DESCRIPTION OF PREFERRED EMBODIMENTS

In the following description, similar features in the drawings have been given similar reference numerals and in order to lighten the figures, some elements are not referred to in some figures if they were already identified in a preceding figure.

Referring to either one of FIGS. 1 to 4 or 9, the overload clutch 2 for a drive train comprises a rotatable drive member 4 coaxially coupled to a rotating driven member 6. It is worth mentioning that in another embodiment of the invention, the member 4 may actually be the driven member and the member 6, the drive member without departing from the scope of the invention.

The driven member 6 comprises an annular band 8 delimiting a central space 9. The annular band 8 has a cylindrical inner face 10 provided with at least one engaging element 12, one in the case of the embodiment shown in FIG. 1 and two in the case of the second preferred embodiment shown in FIG. 9. From now on, and for sake of clarity, reference will be made only to the first preferred embodiment. A more detailed description of the second preferred embodiment will follow hereinafter.

Figure 1:
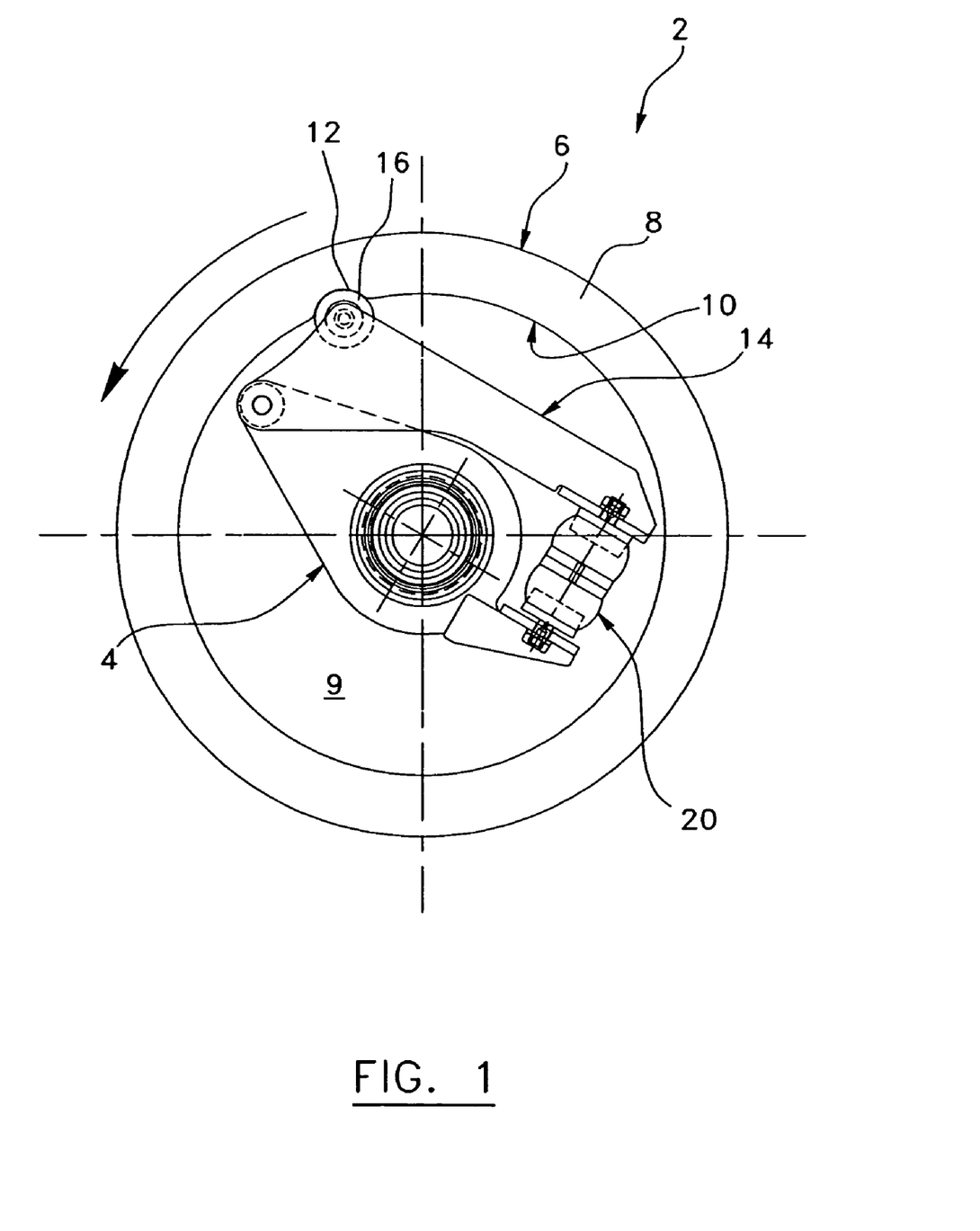
FIG. 1 is a top plan view of an overload clutch according to a first preferred embodiment of the present invention mounted for a counter clockwise rotation, showing the coupling element of the drive member engaged in the engaging element of the driven member.
Figure 2:
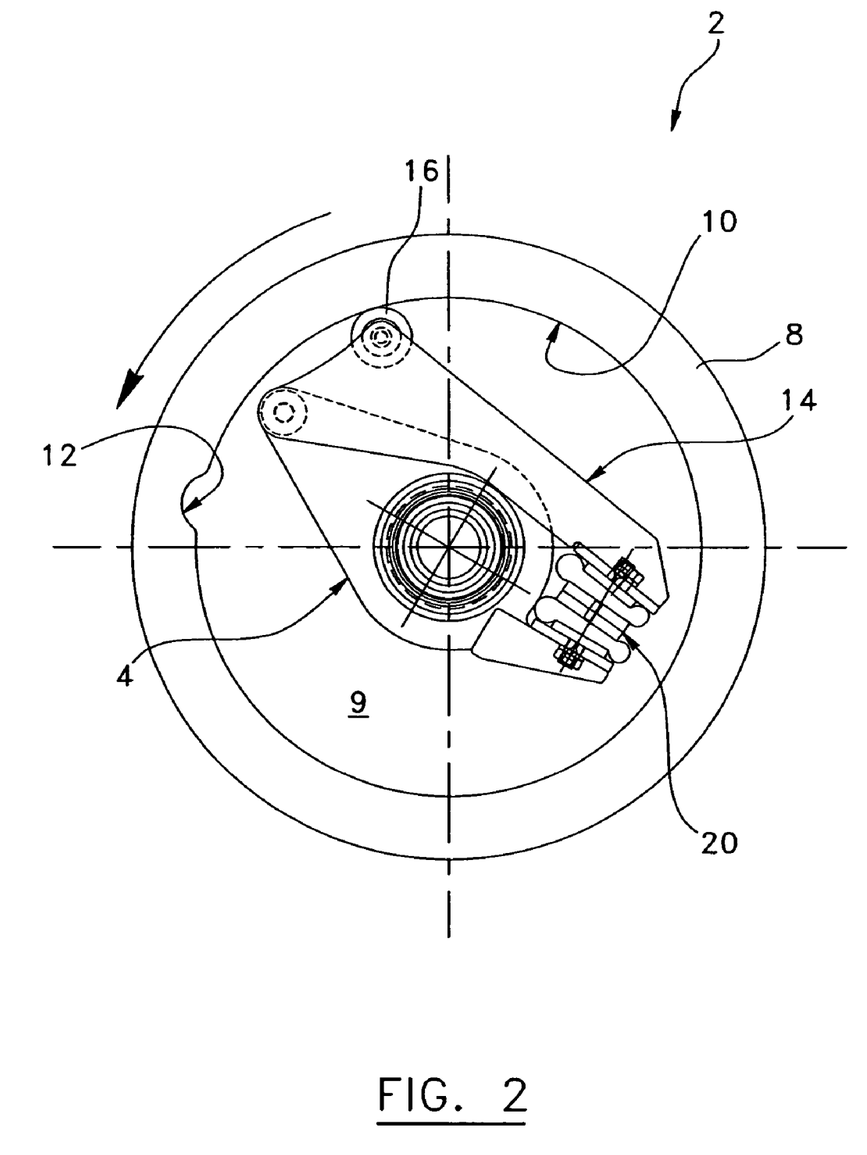
FIG. 2 is the same view as FIG. 1, showing the coupling element disengaged from the driven member.
Figure 3:
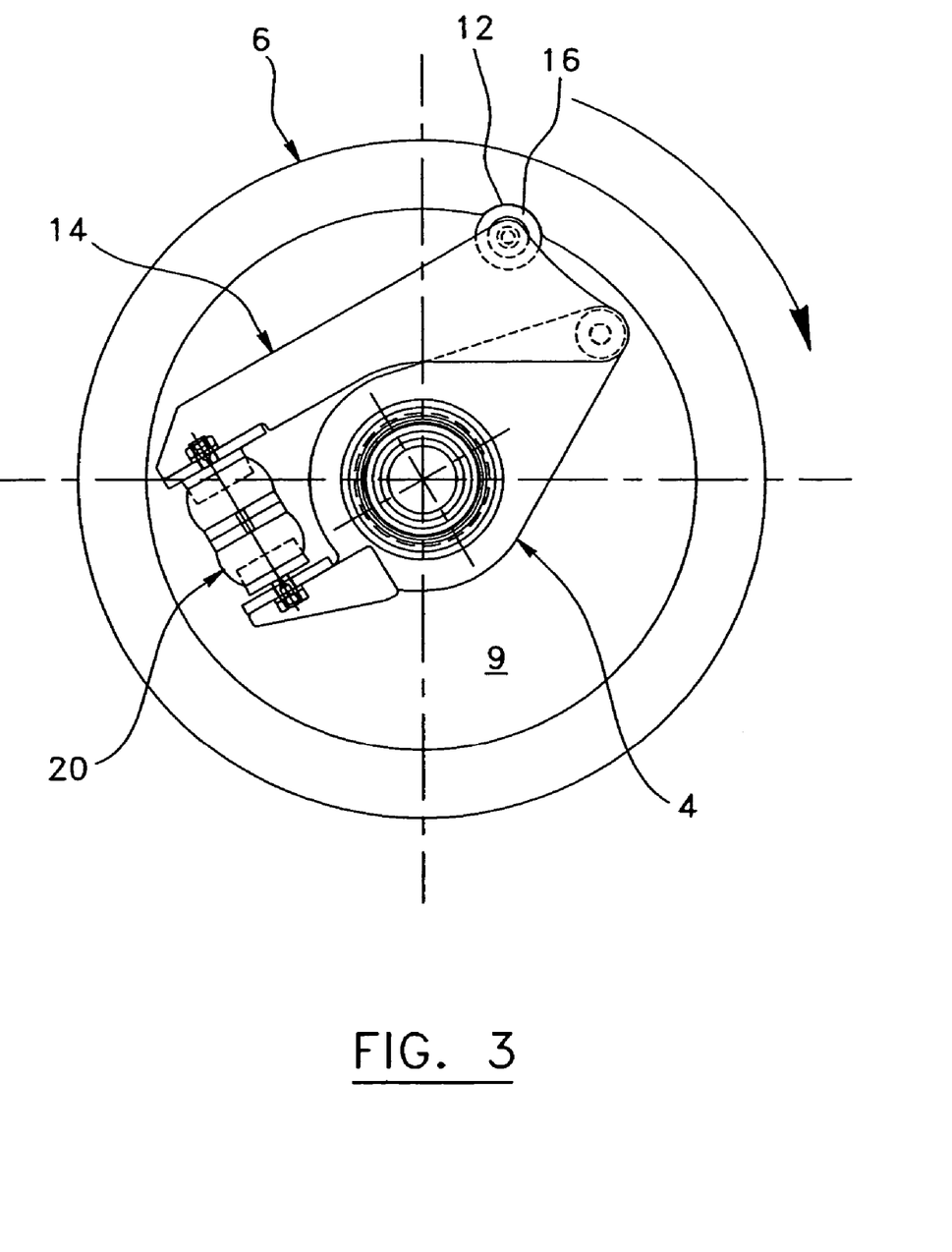
FIG. 3 is a top plan view of an overload clutch similar to the one shown in FIG. 1, except that in this case, the clutch is mounted for a clockwise rotation.

Turning now also to FIG. 2, the drive member 4 is mounted within the central space 9 of the driven member 6 and comprises a radially expandable mechanism 14 provided with a coupling element 16. The radially expandable mechanism 14 is movable between an expanded position, as in FIG. 1, where the coupling element 16 is positively engaging the engaging element 12 to couple the driven member 6 to the drive member 4 for rotation together; and a retracted position, as in FIG. 2, where the coupling element 16 is disengaged from the engaging element 12, thereby releasing the driven member 6 from the drive member 4.

Biasing means 20 are also provided for normally resiliently urging the expandable mechanism 14 in the expanded position and for allowing the same to move to the retracted position when a predetermined torque overload is applied to the torque transmission. The biasing means 20 may consist of a spring such as an helicoidal spring or a rubber element. However, as mentioned above, the biasing means 20 preferably comprises a remotely controllable actuator, preferably a pneumatic actuator, generating a force for urging the expandable mechanism 14 in the expanded position. Advantageously, in that case, the maximum torque that the clutch can sustain without disengaging can be remotely adjusted as required by the specific need. A more detailed description of the drive member 4 embodying that biasing means will follow after the following description of the driven member 6.

Figure 4:
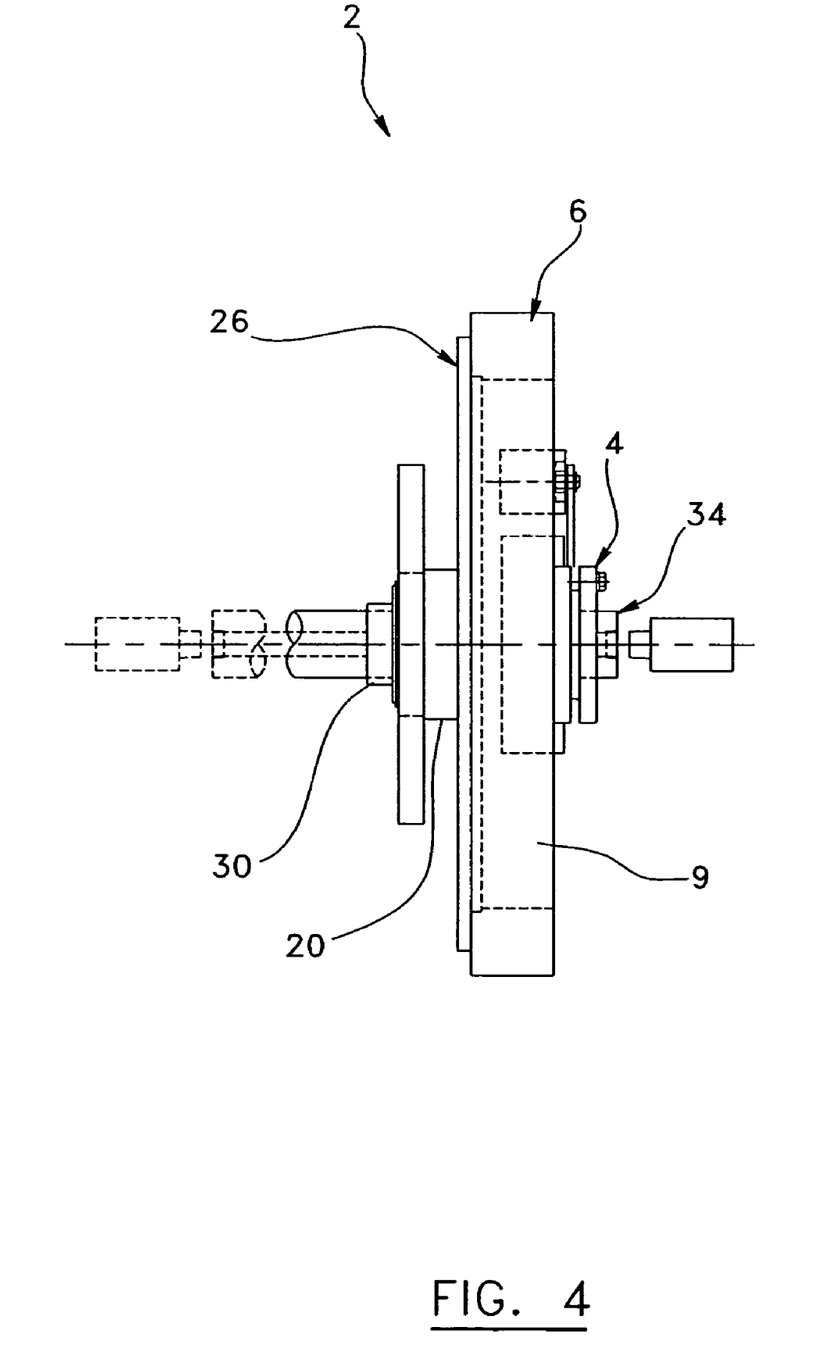
FIG. 4 is a side view, partially exploded, of the overload clutch of FIG. 1, shown with a support shaft and a rotating bearing.
Figure 5:
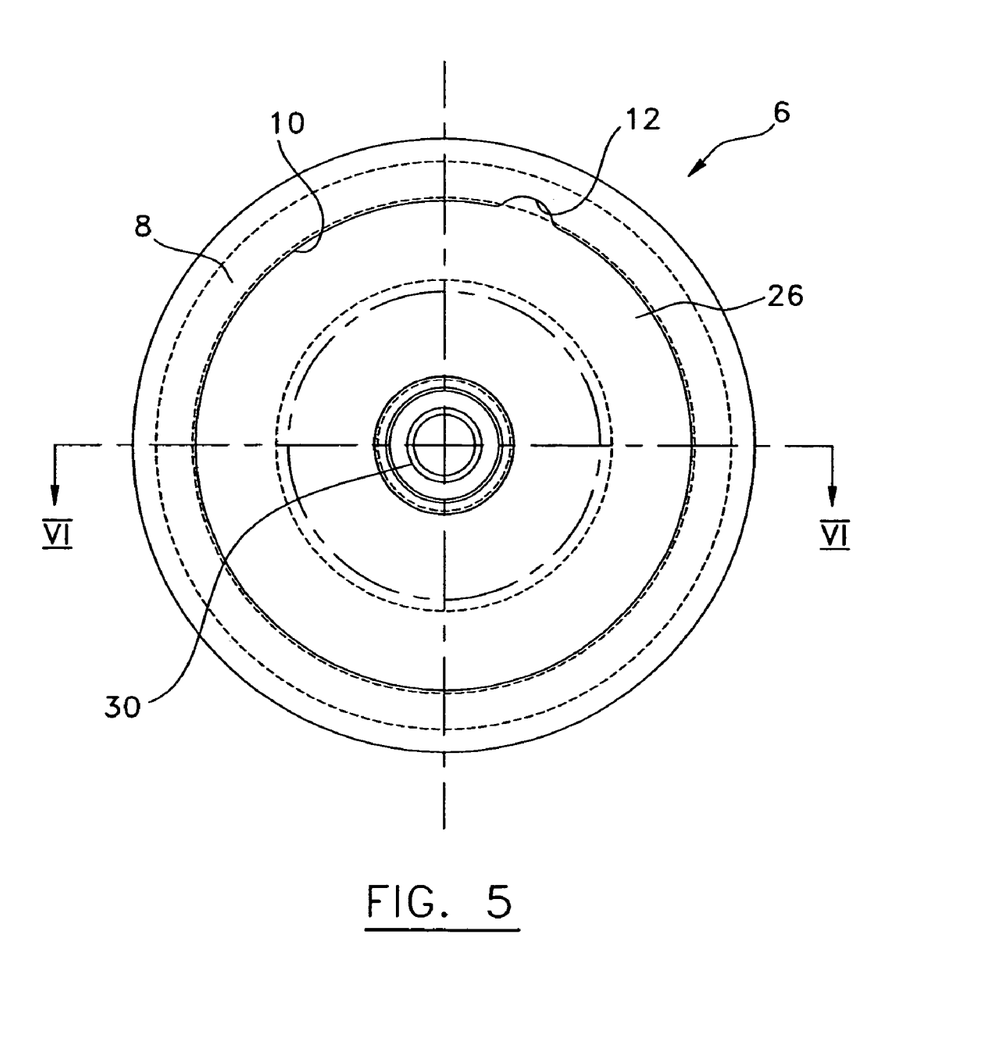
FIG. 5 is a top plan view of the driven member shown in FIG. 1.
Figure 6:
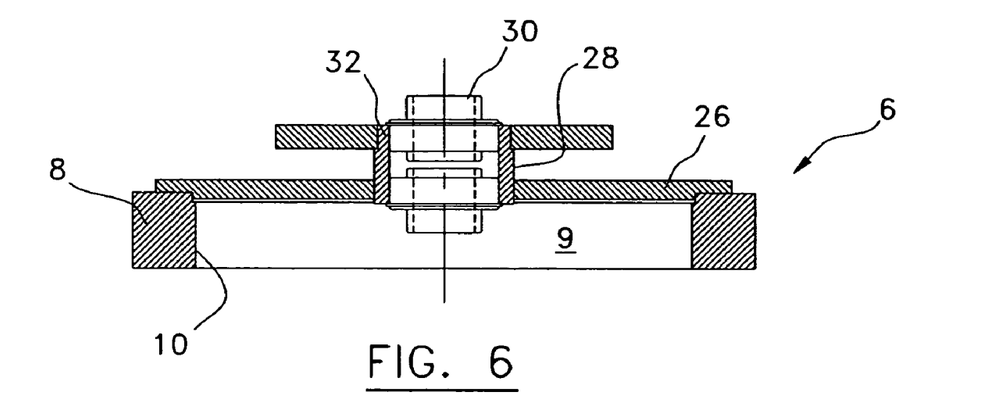
FIG. 6 is a cross-sectional view along line VI—VI of FIG. 5.

Referring to FIGS. 5 and 6, the driven member 6 preferably comprises a circular support panel 26 that forms together with the annular band 8, a housing for lodging the drive member 4, as best shown in FIG. 4. The circular support panel 26 is provided with a central hollow shaft 28 machined to receive bearings 30 for allowing a free rotation under important loads. A machined seat 32 is provided for adapting a central shaft 34 of the drive member 4 by welding or bolting.

Figure 7:
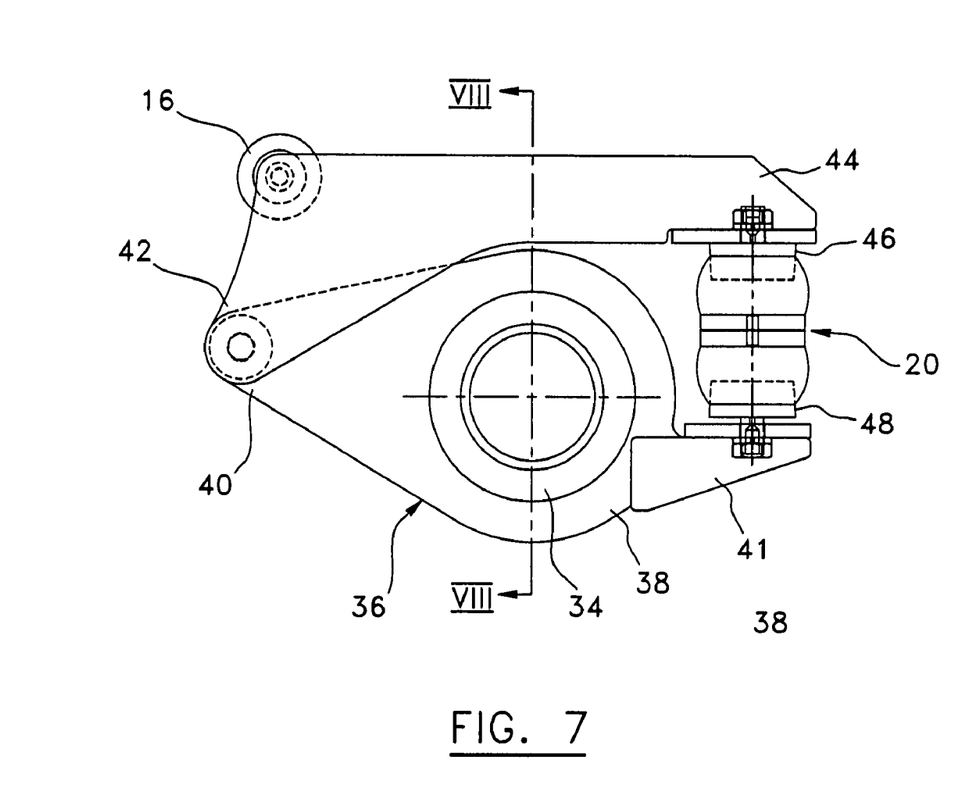
FIG. 7 is a top plan view of the drive member shown in FIG. 1.
Figure 8:
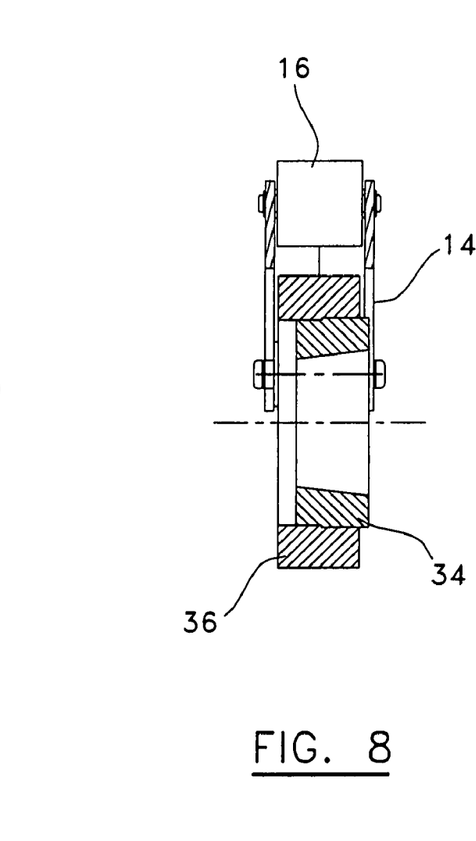
FIG. 8 is a cross-sectional view along line VIII—VIII of FIG. 7.

Referring now to FIGS. 7 and 8, the drive member 4 comprises a support 36, in the form of a plate, with a hub 38 and two opposite radial extensions, a first one 40 and a second one 41, to which is connected the expandable mechanism 14. More specifically, the expandable mechanism 14 consists of a lever with a first end portion 42 pivotally attached to the first extension 40 of the support 36 and a second end portion 44 attached to the second extension 41 by means of the biasing means 20. The coupling element 16, which is located along the lever 14 between the first and second end portions (42, 44), is preferably a roller and the engaging element 12 of the driven member is a recess, as best shown in FIG. 5, dimensioned to fit the roller, thereby allowing the roller to roll on the cylindrical inner face 10 of the driven member 6 when the same is released from the driven member 4. Preferably, the roller is a cylindrical roller. The support 36 is mounted on a driving shaft 34, preferably by pressing.

The lever 14 preferably comprises two spaced facing walls defining a space 45 for nesting the hub 38 of the support 36 when the lever 14 is moved to the retracted position. In another embodiment, the lever may have a U-shaped cross section facing the support 36.

Referring to FIG. 7, the biasing means 20 preferably has a first end 46 opposite a second end 48. The first end 46 is attached to the second end 44 of the lever 14, whereas the second end 48 is attached to the second extension 41 of the support 36. As mentioned above, the biasing means 20 is preferably a remotely controllable actuator generating a force for urging the expandable mechanism 14 in the expanded position. It could be a remotely controllable pneumatic or hydraulic actuator. More preferably, it is a pneumatic actuator, as shown in the figures. Thanks to the use of such remotely controllable actuator, the overload clutch can be operated at different frequencies, loads and torques.

In that case, a remote control is provided for controlling the force generated by the actuator, thereby determining the predetermined torque overload allowable. More specifically, air is supplied to the pneumatic controller by an air supply line mounted within the hollow driving shaft 34. A pressure regulator is operatively connected to this air supply line to adjust the pressure within the pneumatic actuator and thus, the capacity of the clutch during the operation of the drive train in a simple and safe manner.

FIGS. 10 to 13 show different configurations of systems allowing a remote control of the pneumatic actuator. All these systems, which comprise pressure regulator(s) (50), distributor(s) (52), face indicator (54), and lockable valve (56) are conventional and do not need further description.

Figure 9:
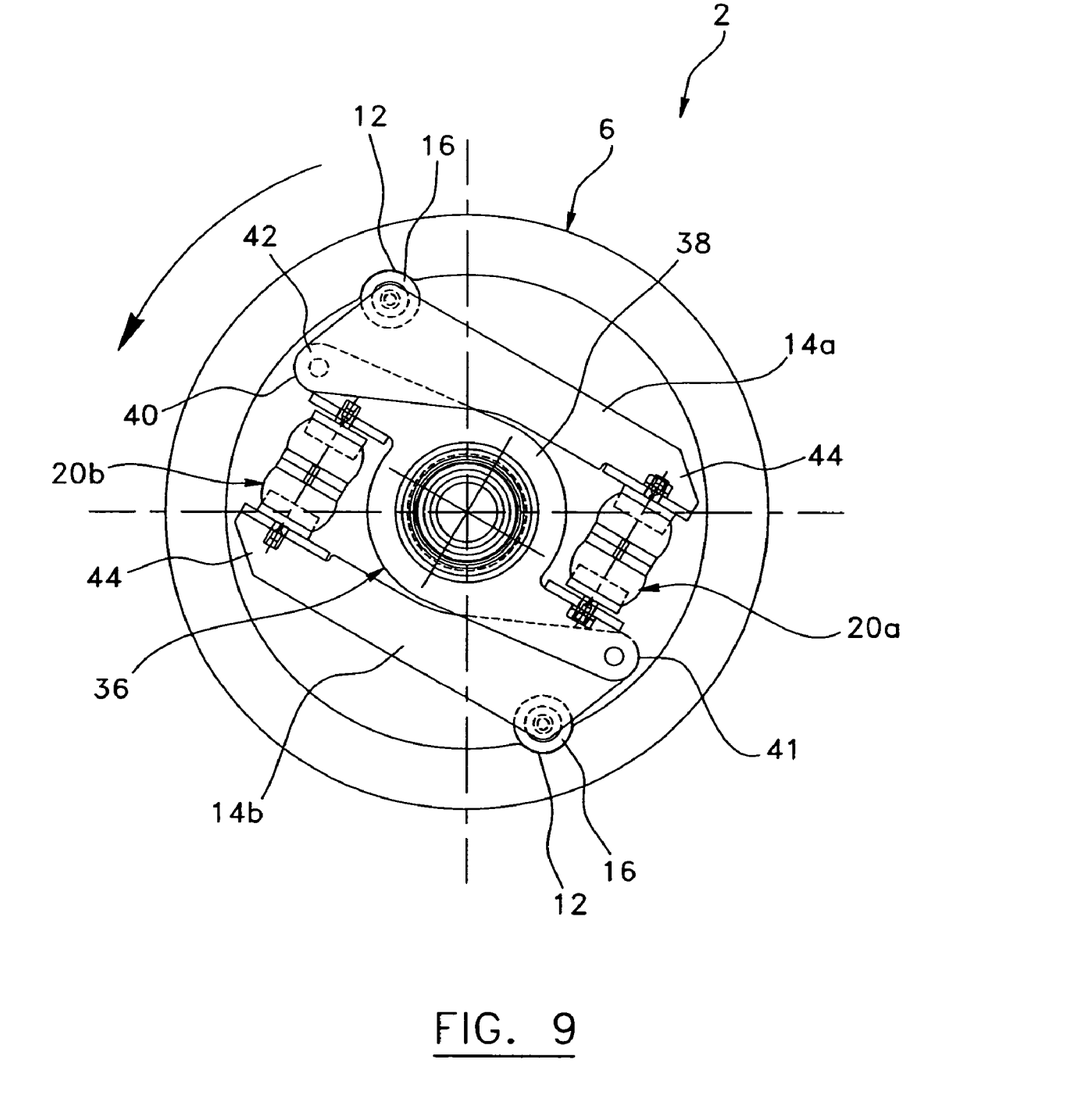
FIG. 9 is a top plan view of an overload clutch according to a second preferred embodiment, comprising two radially expandable mechanisms mounted for a counter clockwise rotation.
Figure 10:
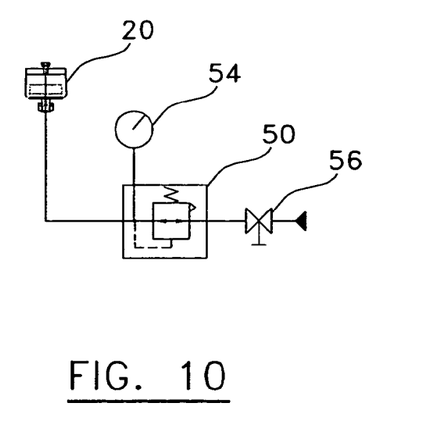
FIGS. 10 to 13 are schematic views of different configurations of control systems for controlling the actuator of the clutches shown in FIGS. 1 and 9.
Figure 11:
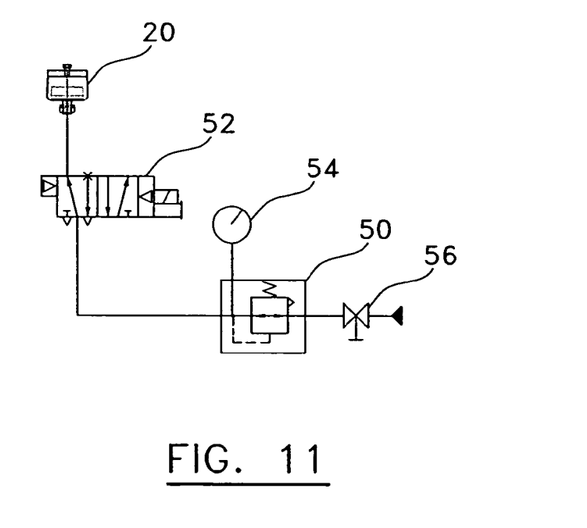
Figure 12:
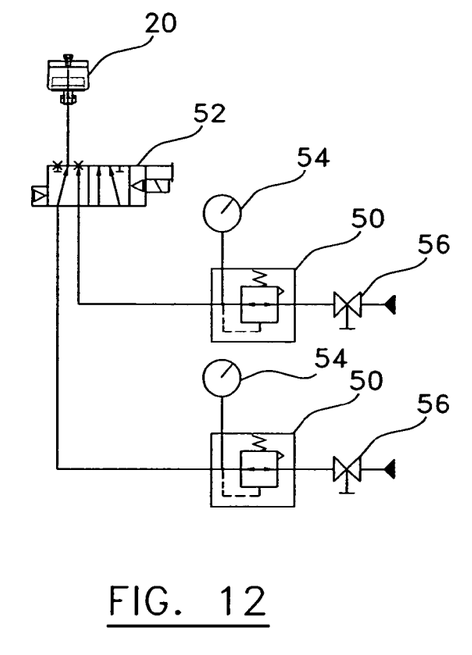
Figure 13:
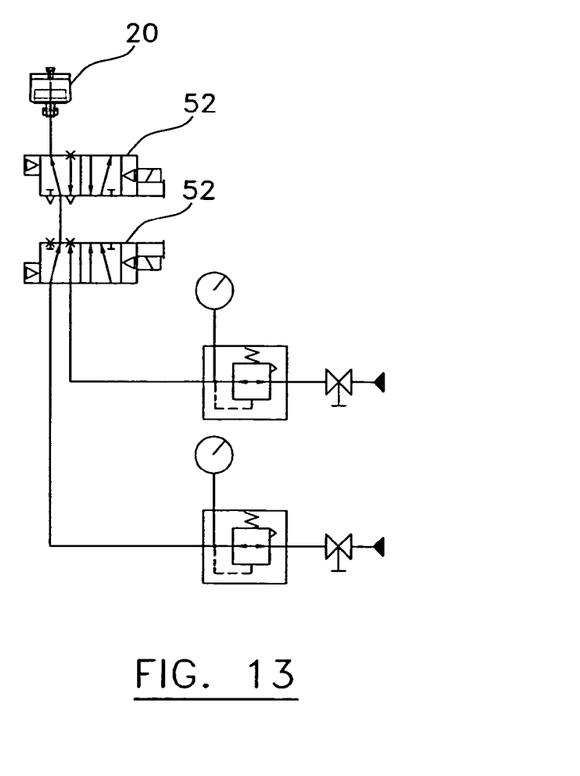

Now referring to FIG. 9, the overload clutch 2 according to a second preferred embodiment comprises two expandable mechanisms 14 as described above, mounted in axial symmetry with respect to the hub 38. More specifically in that case, the lever 14a of one of the expandable mechanisms has a first end 42 directly connected to the first radial extension 40 of the support 36 and a second end 44 connected to the second radial extension 41 of the support 36 by means of a first pneumatic actuator 20a. The lever 14b of the other expandable mechanism has a first end 42 directly connected to the second radial extension 41 of the support 36 and a second end 44 connected to the first extension 40 by means of a second actuator 20b. Thanks to such a symmetrical configuration, the synchronization between the different elements can be maintained, for example, after a disengaging of the clutch, the return of the coupling elements within the recesses always repositioning the assembly at the same place.

What is claimed is:

1. An overload clutch for a torque transmission, comprising:
  a rotatable drive member coaxially coupled to a rotating driven member,
  one of said drive member and driven member, hereinafter referred to as the first member, comprising:
    an annular band delimiting a central space, the annular band having a
    cylindrical inner face provided with at least one engaging element, the other one of said drive member and driven member, hereinafter referred to as the second member, being mounted within said central space and comprising:
    a radially expandable mechanism provided with at least one coupling element, the radially expandable mechanism being movable between an expanded position, where said at least one coupling element is positively engaging said at least one engaging element to couple said first member to the second member for rotation together, and a retracted position, where said at least one coupling element is disengaged from said at least one engaging element, thereby releasing the first member from the second; and a biasing means for normally resiliently urging the expandable mechanism in said expanded position and for allowing the same to move to said retracted position when a predetermined torque overload is applied to the torque transmission wherein the biasing means is a remotely controllable actuator generating a force for urging the expandable mechanism in the expanded position.

2. An overload clutch as defined in claim 1, wherein:

the second member comprises a support with a hub and two opposite radial extensions; and the expandable mechanism comprises a lever with a first end portion pivotally attached to a first one of the extensions and a second end portion attached to a second one of the extensions by means of the biasing means, the coupling element being located along the lever between the first and second end portions.

3. An overload clutch as defined in claim 1, wherein the coupling element is a roller and the engaging element is a recess dimensioned to fit the roller, the roller being allowed to roll on the cylindrical inner face of the annular band when the first member is released from the second member.

4. An overload clutch as defined in claim 3, wherein the roller is a cylindrical roller.

5. An overload clutch as defined in claim 2, wherein the biasing means has a first and a second opposite ends, the first end being attached to the second end portion of the lever and the second end of the biasing means being attached to the second extension.

6. An overload clutch as defined in claim 5, comprising:

a remote control for controlling the force generated by the actuator, thereby determining the predetermined torque overload allowable.

7. An overload clutch as defined in claim 6, wherein the actuator is a pneumatic actuator.

8. An overload clutch as defined in claim 2, comprising two of the expandable mechanisms mounted in axial symmetry with respect to the hub.

9. An overload clutch as defined in claim 2, wherein the lever has a U-shaped cross section facing the support and defining a space for nesting the hub of the support when the expandable mechanism is moved to the retracted position.

10. An overload clutch as defined in claim 1, wherein the first member comprises a circular panel that forms together with the annular band a housing for lodging the second member.

11. An overload clutch as defined in claim 1, wherein the first member is the driven member and the second member is the drive member.

* * * * *